Figure 1:
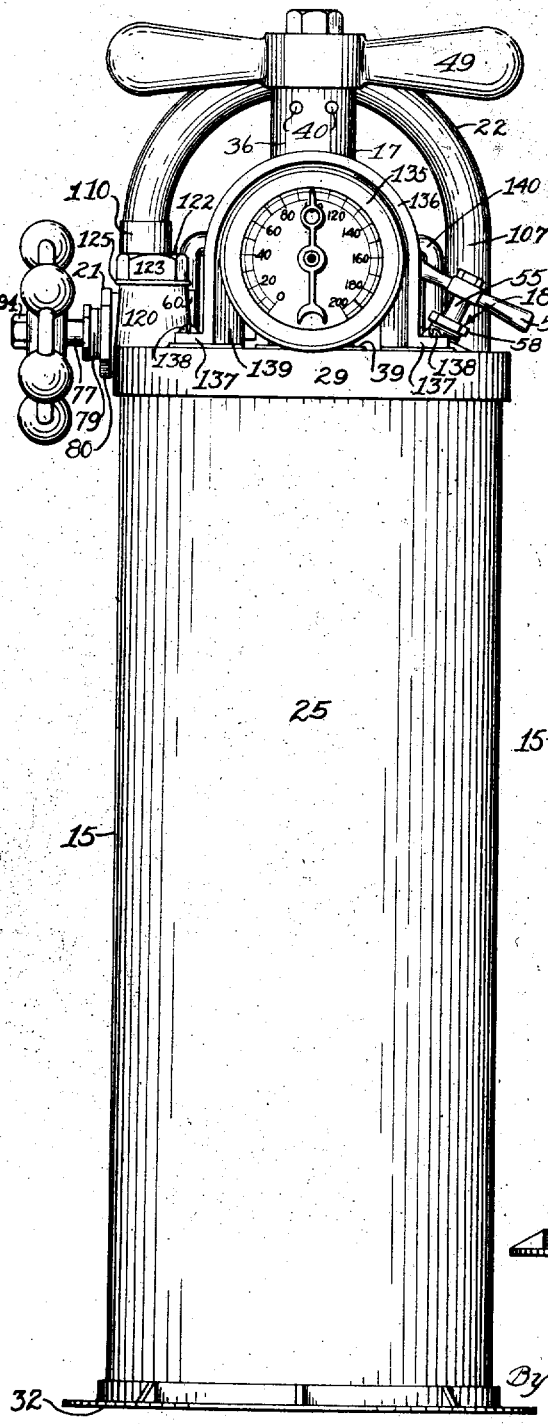

June 21, 1927. Re. 16,662

A. B. PHISTER

CHEMICAL FIRE EXTINGUISHER

Original Filed Sept. 23, 1921 3 Sheets-Sheet 1

Inventor:
Albert B. Phister,
By Dyrenforth, Lee, Christon & Miles,
Attys.

June 21, 1927.

Re. 16,662

A. B. PHISTER

CHEMICAL FIRE EXTINGUISHER

Original Filed Sept. 23, 1921

3 Sheets-Sheet 2

Inventor:
Albert B. Phister,
By Dyrenforth, Lee, Christton & Miles,
Atty's.

June 21, 1927. A. B. PHISTER Re. 16,662
CHEMICAL FIRE EXTINGUISHER
Original Filed Sept. 23, 1921 3 Sheets-Sheet 3
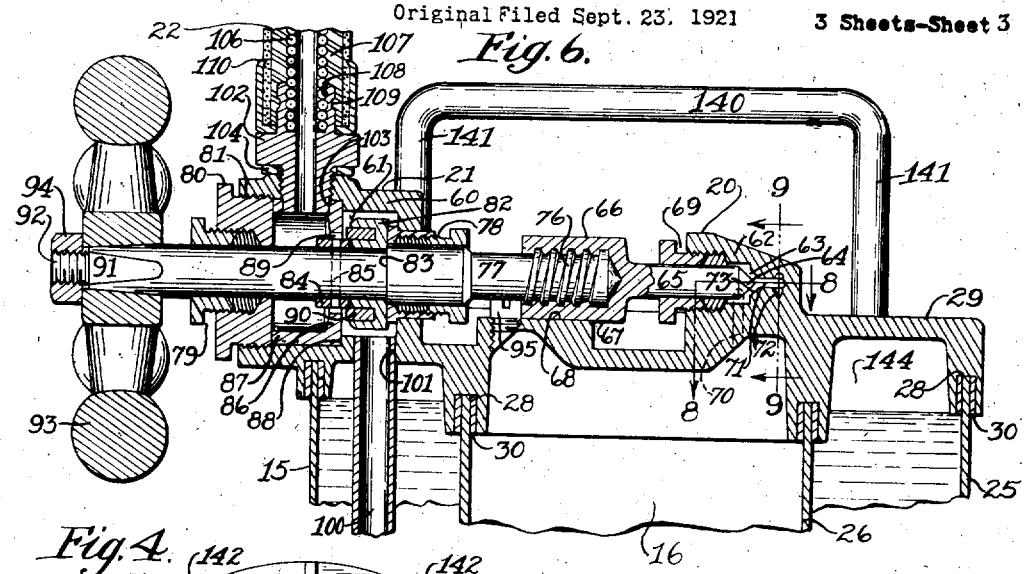
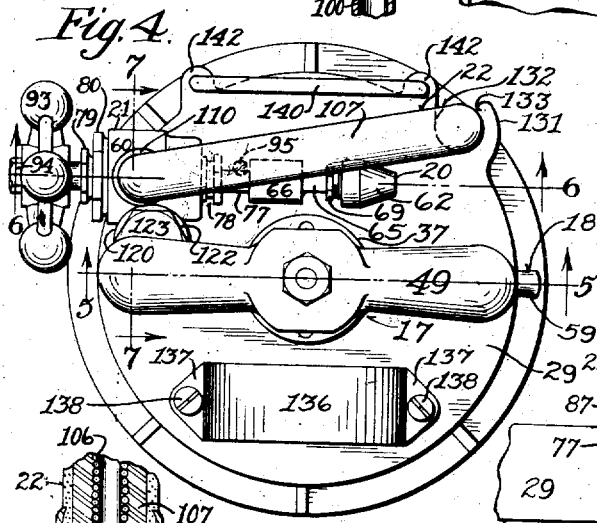
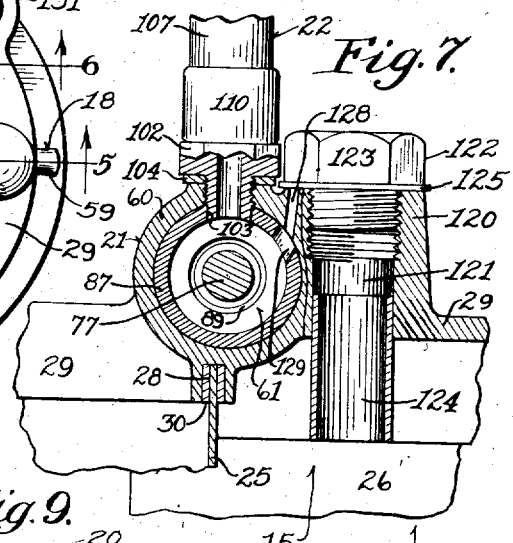
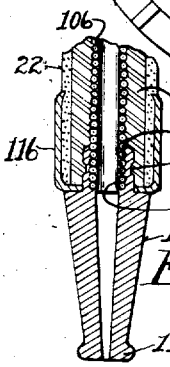
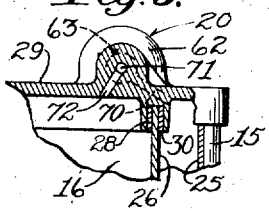
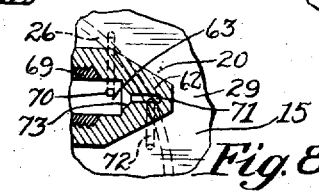
Inventor:
Albert B. Phister,
By Dyrenforth, Lee, Christton & Miles,
Attys.

Reissued June 21, 1927. Re. 16,662

UNITED STATES PATENT OFFICE.

ALBERT B. PHISTER, OF FORT THOMAS, KENTUCKY, ASSIGNOR TO THE PHISTER MANUFACTURING COMPANY, OF CINCINNATI, OHIO, A CORPORATION OF OHIO.

CHEMICAL FIRE EXTINGUISHER.

Original No. 1,606,443, dated November 9, 1926, Serial No. 502,704, filed September 23, 1921. Application for reissue filed February 7, 1927. Serial No. 166,578.

My invention relates to chemical fire-extinguishers and has for its object, the isolation of the working parts from the extinguishing liquid whereby corrosion thereof is prevented; further, to avoid leakage of air from the air-pressure chamber to the liquid-chamber; further, to prevent destruction of the discharge hose by the liquid; and further, to provide a more durable and more conveniently operable construction.

Important features of my invention reside in the provision of a chemical fire-extinguisher of ample capacity, yet readily portable and convenient to operate, and which will be more durable and reliable; further, in the construction and arrangement of the several chambers for containing the liquid and compressed air; further, in means to prevent filling of the liquid-chamber to a higher level than required; further, in combinedly-operated fluid and air-valves housed in a certain relation to other elements of the machine; further, in means whereby the flexible material of the discharge-hose is prevented from coming into contact with the liquid; further, in means to retain said hose in position when not in use; further, in air-vent means for draining said discharge-hose after use; and further, in means whereby injury to pressure-indicating devices is prevented.

An important object of the invention, in addition to those suggested above, is to provide an advantageous arrangement of the various co-operating elements of a fire-extinguisher comprising a liquid-chamber, a pressure-chamber, an air-pump, a liquid-controlling valve, and an air-controlling valve, said valves having common actuating means, such arrangement resulting in a compact and highly effective fire-extinguisher whose parts can be manufactured and assembled with facility, said fire-extinguisher being durable and thoroughly reliable in operation and meeting the exacting requirements of a device which must not fail in emergency.

My invention further consists in the parts, combination and arrangements of parts, and in the details of construction as will hereinafter be more fully described and claimed.

In the drawings which illustrate a preferred embodiment—

Figure 2:
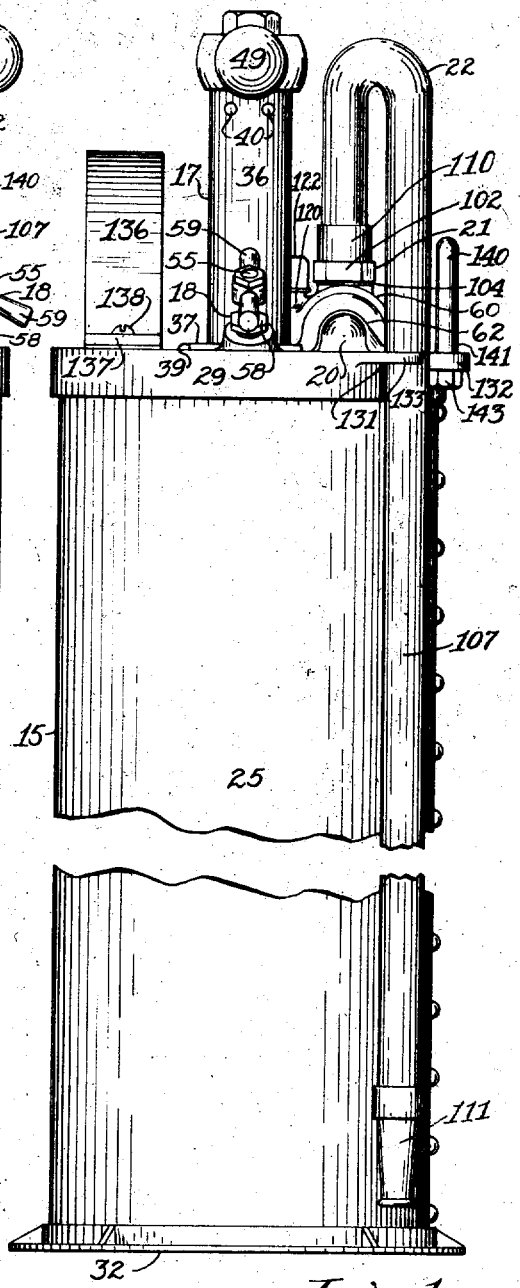
Figure 5:
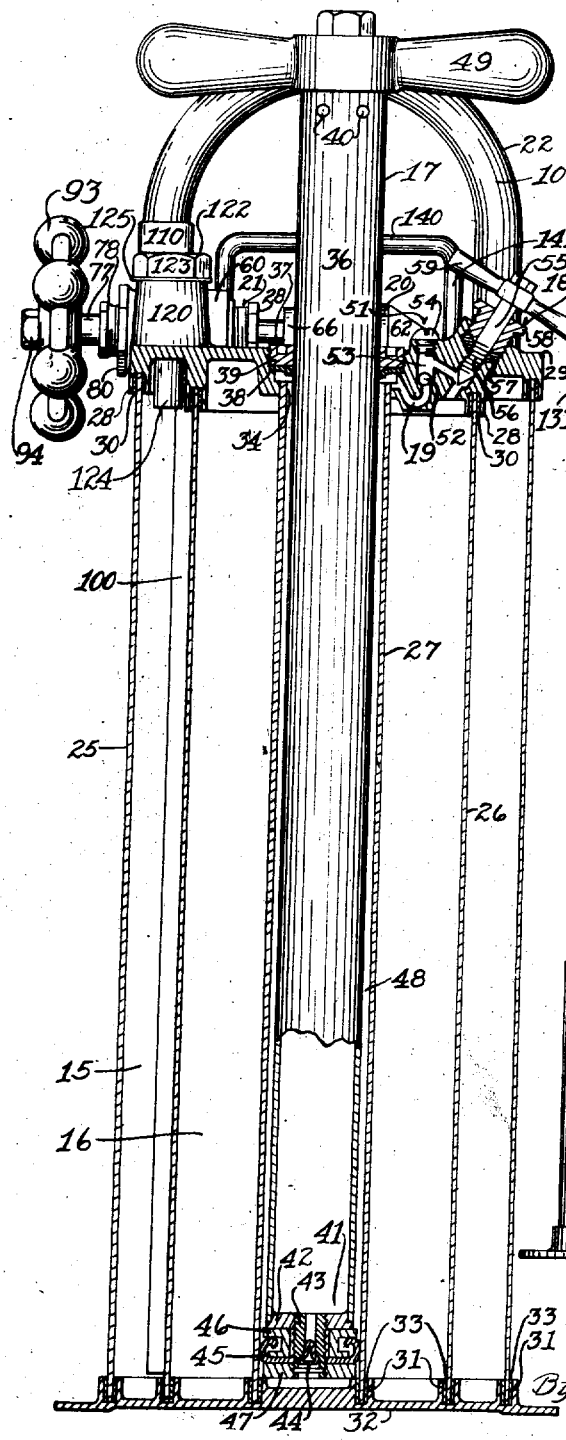
Figure 3:
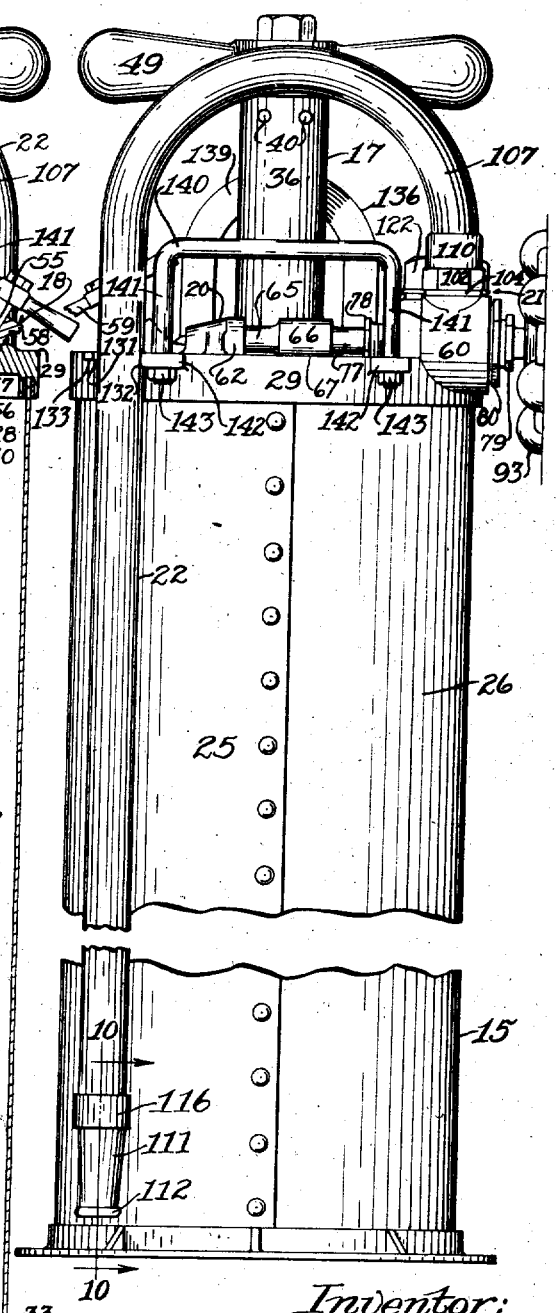

Fig. 1 is a front elevation of a device having my invention embodied therein; Fig. 2 is a side elevation; Fig. 3 is a rear elevation; Fig. 4 is a plan view; Fig. 5 is a central vertical section taken on the line 5—5 of Fig. 4; Fig. 6 is a section of the valve-mechanism taken on the line 6—6 of Fig. 4; Fig. 7 is a vertical cross-section taken in a plane corresponding to the line 7—7 of Fig. 4; Fig. 8 illustrates a portion of the upper head, the air-discharge valve being shown in horizontal section on the line 8—8 of Fig. 6; Fig. 9 is a vertical section of the air-valve taken on the line 9—9 of Fig. 6; and Fig. 10 is a longitudinal section of the discharge-hose nozzle taken on the line 10—10 of Fig. 3.

My invention comprises, in its preferred embodiment, an outer liquid-chamber 15 in which the extinguishing liquid is carried, a pressure-chamber 16 arranged concentrically within the outer chamber for carrying air-pressure to force the liquid from chamber 15, a pump 17 for building up air-pressure in chamber 16, a shut-off valve 18 in a passage 19 between the pump and the chamber 16, a combinedly operable valve-mechanism consisting of an air-control valve 20 whereby air-pressure from chamber 16 is permitted to enter the chamber 15, and a liquid-control valve 21 to permit the extinguishing liquid to be discharged through a discharge-hose 22 by pressure admitted from chamber 16 to chamber 15.

The liquid-chamber 15 is formed between an outer cylindrical shell 25 and an intermediate shell 26. The pressure-chamber 16 is formed between the intermediate shell 26 and a pump-cylinder 27 of the pump 17. The upper end of the shells 25 and 26 are secured in grooves 28 of an upper head 29 by bodies of solder 30. The lower ends of the shells and the pump-cylinder are secured in grooves 31 of a lower head 32 by bodies of solder 33. The upper end of the pump-cylinder is held in a hole 34 in the upper head 29.

Air-pressure is built up in the pressure-chamber 16 by the hand pump 17 comprising a tubular piston rod 36 reciprocally operable in the cylinder 27 and having a bearing in a stuffing box 37 in the upper head 29. This stuffing box comprises a cup washer 38 held in place by a nut 39 having threaded connection with the head. Intake openings 40 are located in the upper end of the tubular piston rod, the bore of which forms communication with a piston 41.

The piston is formed as by a disk 42 secured in the lower end of the piston rod as by soldering and has a threaded nipple 43 projecting therefrom, which has a check valve 44 therein so arranged as to admit air below the piston on the upstroke only. A cup washer 45 is confined between the spacing collar 46 received about the nipple and a nut 47 having threaded connection therewith.

The annular flange of the cup washer extends upwardly which acts as a check valve as well as a packing for the piston. The air compressed in the cylinder below the piston on the down stroke is thus enabled to pass into annular space 48 between the piston rod and the pump-cylinder. This construction acts in effect as a two stage pump. A handle 49 is secured to the upper end of the piston rod for conveniently actuating the same.

The passage 19 forms communication between the pressure-chamber 16 and the upper end of the pump-cylinder. A check-valve 51 is located in this passage and is so arranged as to permit air from the pump to pass into the pressure-chamber but not to pass therefrom. The check-valve comprises a ball 52 operable in a ball chamber 53 closed by a screw 54. The shut-off valve 18 is located in the passage 19 between the check valve and the entrance to the pressure-chamber. This valve comprises a conically pointed stem 55 having threaded connection with a threaded bore 56 interrupting the passage 19. The conical point of the stem coacts with that portion of the passage between the bore 56 and the pressure-chamber. To make the stem 55 air-tight a packing 57 is received in an enlargement of the bore 56 and held therein by a packing nut 58. A handle 59 is secured to the outer end of the stem for manually operating the same.

The outer chamber is adapted to contain a fire-extinguishing liquid, for instance, carbon tetrachloride. The inner chamber is adapted to carry air under pressure supplied thereto by the pump. This chamber is normally closed from the outer chamber by the air discharge valve 20, and the discharge-hose is normally closed off from the liquid-chamber by the liquid discharge valve 21. Air pressure from the inner chamber is adapted to be exerted against the liquid in the outer chamber and in this manner eject the same therefrom through the discharge-hose by controlling devices for combinedly operating valves 20 and 21. These controlling devices are so devised that when in case of emergency, a fire is to be extinguished, the air-pressure admitted from the inner chamber to the outer chamber is caused to discharge the extinguishing liquid by manipulating but a single handwheel.

The construction herein illustrated and showing a preferred form, comprises a liquid-valve body 60 having a valve-chamber 61 therein, in which the valve 82 is operable, and an air-valve body 62 having a valve chamber 63 in which the valve 64 is operable. I prefer to form the valve-bodies 60 and 62 integral with the upper head 29 as a single casting, and so dispose the same as to have the valve body 60 directly over the liquid-chamber, and the valve body 62 partly over the liquid-chamber and partly over the air pressure-chamber. In the illustration given, the valve-bodies preferably are arranged in axial alignment with each other. The air valve 20 comprises a conical end 64 on a stem 65 which is integrally formed with an integrally threaded socket 66. The socket has a flat bottom surface 67 adapted to co-act with a bearing surface 68 on the head which causes the stem 65 to have a reciprocal movement in a stuffing box 69 in the valve-body 62. A slanting passage 70 connects the valve-chamber 63 with the liquid-chamber. A horizontal passage 71 in axial alignment with the valve-stem leads from the valve-chamber and has connection by a slanting passage 72 with the compressed-air chamber 16. The conical end 64 of the stem 65 co-acts with a seat 73 on the wall of the passage at its entrance to the valve-chamber to either confine the compressed air in the chamber 16 or permit the same to enter the liquid-chamber 15.

The socket 66 has threaded connection 76 for the inner end of a valve shaft 77 carried for both rotary and endwise movement in a stuffing box 78 in the inner end of the valve-chamber 61, and a stuffing box 79 in a closure cap 80 closing the outer end of said valve-chamber and having threaded connection 81 therewith. The valve 21 comprises a disk 82 preferably loosely held about the valve-shaft, between a shoulder 83 and a collar 84 held in place by pin 85. The disk 82 co-acts with a valve-seat 86 on a removable seat-member 87 held against a shoulder 88 in the valve-chamber 61 by the closure cap 80. The seat has a hole 89 therein of substantially larger diameter than the collar 84 in order that the liquid may pass when the valve is open. I prefer to face the valve-disk with a comparatively soft non-corrodible metal, such as a mixture of tin and lead, as shown at 90, in order that the valve may at all times be perfectly tight when closed. The projecting portion of the valve-shaft is polygonal in form, as shown at 91, and further has a threaded end 92 thereon. A hand wheel 93 having a bore of like form is received over the polygonal portion of the shaft and is held in place by a nut 94 on the threaded end.

The valve-shaft 77, and the socket 66 with the stem 65 thereon form a free floating expansible and contractible member. When the hand wheel is rotated in one direction, the valves 64 and 82 are forced to their seats. In this position should the valve-disk 82 cling tightly to its seat when the hand wheel is turned in the other direction, the entire contracting action would be confined to the air valve. I therefore provide a stop screw 95 so positioned as to limit the movement of the socket 66, which causes the same to act as a stationary nut for the valve-shaft, and thereby force the disk away from its seat. In similar manner should the air valve stick in its seat the valve-shaft will move endwise until the disk 82 strikes the stuffing box 78, after which it acts as a rotatable screw, which in turn pulls the air-valve from its seat.

In order to properly convey the liquid to the valve-chamber, a depending liquid eduction pipe 100 has its upper end soldered in a hole 101 in such manner as to connect with the valve-chamber. This pipe extends very nearly to the bottom of the liquid-chamber. In this manner, when air-pressure is applied to the top of the liquid, the liquid will rise in the pipe and enter the valve-chamber and be discharged, thereby enabling the liquid-chamber to be entirely emptied.

To properly direct the extinguishing liquid the flexible discharge-hose 22 is attached to the valve-chamber by a nipple 102 having threaded connection with the valve-body 60. The nipple is of sufficient length to extend through a hole 103 in the removable valve-seat member which holds the same in place. A gasket 104 is received between the nipple and the valve-body in order to prevent leakage. I prefer to so construct the hose as to prevent the extinguishing liquid coming into contact with the rubber portions thereof. Therefore, a non-corrodible flexible metallic tubing 106 is inserted in a rubber hose or sheath 107 consisting of layers of rubber impregnated fabric. One end of the flexible metallic tubing is received in a counter bore 108 of the nipple, which has a groove 109 therein to hold the rubber hose in place. The inner end of the hose and the nipple are effectively held together by a clamp ferrule 110. The outer end of the hose has a nozzle 111 thereon which comprises a nozzle tip 112 having a reduced shank 113, which has a groove 114 therein to hold the rubber hose in place. The reduced shank has a counter bore 115 therein, in which the other end of the flexible metallic tubing is received. The outer end of the hose is firmly clamped about the reduced shank of the nozzle by a clamp ferrule 116. The nozzle is preferably formed of non-corrodible metal, such as lead or tin and therefore does not deteriorate.

Filling means are provided whereby the fluid may be placed in the outer compartment. Thus, a filling mouth 120 is formed in the upper head which has an opening 121 therein, the upper end of which is threaded to receive a closure plug 122 having a polygonal head 123 thereon for conveniently turning the same. The lower end of the opening has a short tube 124 secured therein as by soldering, in order that when the liquid is poured into chamber 15 an air space is formed to allow for the expansion of the liquid, which expands somewhat with increase of temperature. A gasket 125 is received between the polygonal head and the upper end of the mouth.

Means are provided whereby the hose may be drained automatically after the device has been used to extinguish a fire. Thus a vent passage 128 in the wall of the mouth communicates with the valve-chamber by means of a hole 129 in the removable seat-member 87, thus permitting the hose to automatically drain when the filler cap is removed.

I prefer to provide a hose retaining means indicated at 131, in order that the hose may be held when the extinguisher is not in use. This retaining device comprises an open side socket 132 integrally formed with the upper head as by an overhanging hook 133. This hook preferably overhangs the socket in such manner as to form an entrance thereto slightly smaller than the diameter of the hose. The hose may be placed in the socket by forcing the same past the overhanging hook, the rubber layers of the hose acting as a resilient body readily contracting under outside pressure and afterwards expanding when entirely in the socket. In this manner the hose is prevented from swinging and flying about and becoming worn when the extinguisher is not in use.

A pressure indicating gage 135 is mounted on the upper head 29 and has tubular connection with the compressed air chamber. The mechanism of these gages is necessarily delicate and finely adjusted, moreover they are equipped with glass fronts which may be accidentally broken. To properly protect this pressure gage a semicircular hood 136 is secured to the upper head as by forming lugs 137 thereon through which screws 138 pass and are threaded into the upper head. The hood further has a reinforcing rib 139 thereon received behind the gage which provides additional protection therefor. In this manner the gage cannot be injured should it be inadvertently struck when the extinguisher is in use.

To carry the device I provide a U-shaped handle 140, the vertical tangs 141 of which have their lower ends threaded and received through projecting lugs 142 on the head 29. The handle is held in place by nuts 143 having threaded connection with the tangs 141.

To charge the extinguisher carbon tetrachloride or similar fire-extinguishing liquid is poured into the outer chamber through the mouth 120 after first removing the plug 122. The fluid enters the chamber through the short tube 124 until the level of the liquid reaches the bottom thereof. An air pocket 144 is thus formed, thereby preventing the chamber from being entirely filled. We will assume that the air discharge valve 20 and the liquid discharge valve 21 are closed, the operation and function of which will be later described. The air shut-off valve 18 is opened by turning the handle 59. This opens the passage 18 between the pump 17 and the compressed air-chamber 16. The operator stands with his feet on the flange at the bottom thus holding the machine while he operates the pump. The pump is now actuated by the handle 49 which draws in air through the openings 40 into the hollow piston rod of the pump. On the upstroke this air is sucked in and enters the cylinder 27 below the piston 41, through the check valve 44. On the down stroke the air previously taken in through the check valve and which is now below the piston is compressed and flows past the cup washer 45 into the annular space 48 about the piston rod. On the next upward stroke this partly compressed air is now forced through the passage 19 and past the check valve 51 into the compressed air chamber 16. The pumping action is continued until approximately one hundred pounds pressure is built up in the compression chamber. The check valve 51 prevents pressure from escaping by way of the pump. The shut-off valve 18 is now closed which effectively confines this pressure within the chamber.

Should it become necessary to employ the extinguisher to put out a fire, the hand wheel 93 is manipulated which combinedly opens valves 20 and 21 by the contracting action of the valve-shaft 77 and threaded socket 66. This permits compressed air from the chamber 16 to exert pressure on top of the liquid in the chamber 15, entering by way of passage 70, valve-chamber 63, passage 71, and passage 72. The pressure on the liquid forces the liquid up the stand pipe 100 into the valve-chamber 61 and out through the hose 22 and the nozzle 111, the same causing a high velocity to be imparted to the stream of liquid.

After the liquid has been exhausted and it is necessary to again recharge the device, the plug 122 is removed from the mouth which permits any liquid that may be retained in the hose to be drained out through the nozzle by breaking the vacuum in the valve-chamber by uncovering the vent passage 128.

It will be observed that no working parts are normally in contact with the extinguishing liquid, which feature adds long life and durability to the device. When pressure is once pumped up in the pressure-chamber there is no chance for the same to escape by leaking through the check-valve or pump, as the passage may be effectively closed by the shut-off valve 18.

My improved extinguisher is of light weight and sturdy construction, and simple to operate, it only being necessary to manipulate one handwheel to bring the device into action. Owing to my improved construction of combinedly-operated valves, the device is absolutely certain in its operation, sticking of the valves being entirely avoided. By the same means absolute closing of the valves is assured and will at all times remain closed unless the handwheel is manipulated.

From the description which has been given, it will be understood that the liquid-chamber, the pressure-chamber, and the air-pump are in parallel relation and comprise shells confined between upper and lower heads which are common to both chambers; also, that the pump-cylinder, or pump-casing, has its lower end secured to the lower head and its upper end secured to the upper head, said cylinder communicating, through a charging air-duct in the upper head, with the pressure-chamber; also, that the pump is centrally located so as to give a compact and well-balanced machine; also, that the pump-plunger works through a central opening in the upper head, a suitable stuffing-gland being provided between the plunger and the upper end of the pump-cylinder; also, that the upper head has therein a service air-duct leading from the pressure-chamber to the liquid-chamber and a service valve-chamber controlling said duct; also, that the upper head has therein a liquid-outlet duct and a service-valve chamber interposed in the course of said duct; and the service-valves controlling the admission of compressed air to the liquid-chamber and the outlet of liquid from the liquid-chamber are housed in the valve-chambers with which the upper head is provided and actuated by a common actuating means. These features, specifically, are advantageous and preferred, but equivalent construction and arrangement of elements may be made without departure from my invention.

It is to be understood, therefore that the foregoing detailed description, based upon a preferred embodiment, has been given to facilitate an understanding of the invention, but without intent to limit the invention unnecessarily, it being my intent to claim the invention as broadly as permissible, in view of the prior art.

What I claim as new, and desire to secure by Letters Patent, is:

1. In a fire-extinguisher, a liquid-chamber adapted to be supplied with liquid, an air-chamber, means for charging said air-chamber with compressed gas, a needle-valve for controlling the passage of compressed gas from said air-chamber into said liquid-chamber whereby said liquid is forced therefrom, and means operatively connected with said needle-valve to control the discharge of liquid from said liquid-chamber, common operating means for said needle-valve and said liquid control means, the operative connection between said needle-valve and said liquid control means being so constructed that upon actuation of said common operating means said needle-valve and liquid control means are moved in opposite directions.

2. In a fire-extinguisher, a liquid-chamber, adapted to carry a fire-extinguishing liquid, an air pressure chamber, a pumping means for charging said air-chamber, a pair of spaced apart and disconnected valve-chambers, a pair of spaced apart valves manually and combinedly actuatable in opposite directions in said valve-chambers, respectively, one of said valves controlling the discharge of liquid from said liquid-chamber, and the other of said valves permitting air-pressure from said air-chamber to enter said liquid-chamber to cause the liquid to be expelled therefrom.

3. In a fire-extinguisher, a liquid-chamber, an air-chamber, a pumping means for building up pressure in said air-chamber, a disk-valve having tubular connection with the lower end of said liquid-chamber, a directive discharge means having tubular connection with said valve, a needle-valve having tubular connection with said air-chamber and said liquid-chamber, a mechanical connection between said disk-valve and said needle-valve capable of expansion and contraction for causing movement of said valves in opposite direction from and toward each other, and manual actuating means attached to said mechanical connection whereby said valves are combinedly closed and combinedly opened.

4. In a fire-extinguisher, a liquid-chamber, an air-chamber, pumping means to build up air-pressure in said air-chamber, a valve-body mounted partly over said liquid-chamber and partly over said air-chamber and having a valve-chamber therein, a passage connecting said air-chamber and said valve-chamber, a second passage connecting said valve-chamber and said liquid-chamber, a stem movable endwise having a conical end thereon adapted to co-act with one of said passages to form an air-valve, a second valve-body mounted over said liquid-chamber having a valve-chamber therein, a tube connecting said last named valve-chamber with the lower part of said liquid-chamber, a valve-shaft mounted for reciprocal and rotary movement in said last named valve-chamber, a valve-disk carried on said valve-shaft within said last named valve-chamber, a valve-seat in said last named valve-chamber to co-act with said valve-disk to form a liquid-valve, said valve-shaft having screw connection with said valve-stem, and manual actuating means on said valve-shaft whereby said screw connection is operated either to cause said valves to approach each other to withdraw from their seats or recede from each other to contact their seats.

5. In a fire-extinguisher, a liquid-chamber, an air-chamber, pumping means to build up air-pressure in said air-chamber, a valve-body mounted partly over said liquid-chamber and partly over said air-chamber and having a valve-chamber therein, a passage connecting said air-chamber and said valve-chamber, a second passage connecting said valve-chamber and said liquid-chamber, a stem movable endwise having a conical end thereon adapted to co-act with one of said passages to form an air-valve, a second valve-body mounted over said liquid-chamber having a valve-chamber therein, a tube connecting said last named valve-chamber with the lower part of said liquid-chamber a valve-shaft mounted for reciprocal and rotary movement in said last named valve-chamber, a valve-disk loosely carried on said valve-shaft within said last named valve-chamber, a valve-seat in said last named chamber to co-act with said valve-disk to form a liquid-valve, said valve-shaft having screw connection with said valve-stem, and manual actuating means on said valve-shaft whereby said screw connection is operated either to cause said valves to approach each other to withdraw from their seats or recede from each other to contact their seats.

6. In a fire-extinguisher, a liquid-chamber, an air-chamber, pumping means for forcing air into said air-chamber, an air-valve adapted to control the passage of air from said air-chamber to said liquid-chamber and comprising a valve-body, a valve-chamber therein, passages connecting respectively with said air-chamber and said valve-chamber, and said liquid-chamber and said valve-chamber, a valve-seat in one of said passages, a conically pointed stem movable endwise and adapted to co-act with said seat, a threaded socket integrally formed with said stem, means to hold said socket and stem against rotary motion, limiting means to control the movement of said socket and stem, a liquid-valve having tubular connection with the lower end of said liquid-chamber, a discharge-hose secured to said valve and having tubular connection therewith, said valve comprising a valve-body, a removable seat therein, a valve-shaft mounted for combined rotary and endwise movement in said valve-body and passing therethrough, a valve-disk mounted on said valve-shaft, a non-corrosive soft metal facing on said disk adapted to contact said removable seat, means to hold said removable seat in place, said valve-shaft having a threaded extension adapted to co-act with said threaded socket to cause said valve-disk and said conically pointed valve-stem to approach each other an open said valves, or to recede from each other to forcibly close said valves, and a hand wheel secured on said valve-shaft whereby said valves are combinedly opened and combinedly closed.

7. In a fire-extinguisher, an upper head having an annular groove therein adjacent its periphery, a second annular groove therein located within said first named groove, and a hole therein located within said second named groove, a lower head having an outer annular groove therein adjacent its periphery, an intermediate annular groove therein located within said outer groove, and an inner groove located within said intermediate groove, a cylindrical shell whose upper end is received in said first named groove of said upper head and whose lower end is received in said outer groove of said lower head, a second cylindrical shell whose upper end is received in said second named groove of said upper head and whose lower end is received in said intermediate groove of said lower head; a third cylindrical shell whose upper end is received in said hole in said upper head, and whose lower end is received in said inner groove in said lower head, the association of said shells and heads forming in the order named respectively, a liquid-chamber, an air-chamber and a pump cylinder arranged within each other, a pumping means in said pump cylinder whereby air-pressure is built up in said air-chamber, means to convey liquid from the bottom of said liquid-chamber, a discharge-hose, a liquid-valve between said liquid conveying means and said hose, an air-passage between said air-chamber and said liquid-chamber, an air-valve in said passage, a mechanical connection between said air-valve and said liquid-valve capable of expansion and contraction and manual actuating means operatively connected with said mechanical connection whereby said valves are opened and closed in opposite directions, a passage between said pump cylinder and said air-chamber, a check-valve in said passage, and a manually actuatable valve in said passage between said check-valve and said air-chamber, whereby said air-chamber may be closed from said pump.

8. In a fire-extinguisher, an upper head having an annular groove therein, adjacent its periphery, a second annular groove therein located concentrically within said first named groove, and a hole therein located concentrically within said second named groove, a lower head having an outer annular groove therein adjacent its periphery, an intermediate annular groove therein located concentrically within said outer groove, and an inner groove located concentrically within said intermediate groove, a cylindrical shell whose upper end is received in said first named groove of said upper head and whose lower end is received in said outer groove of said lower head, a second cylindrical shell whose upper end is received in said second named groove of said upper head and whose lower end is received in said intermediate groove of said lower head, a third cylindrical shell whose upper end is received in said hole in said upper head, and whose lower end is received in said inner groove in said lower head, the association of said shells and heads forming in the order named respectively, a liquid-chamber, an air-chamber and a pump cylinder arranged concentrically within each other, a pumping means in said pump cylinder whereby air-pressure is built up in said air-chamber, means to convey liquid from the bottom of said liquid-chamber, a discharge-hose, a liquid-valve between said liquid conveying means and said hose, an air-passage between said air-chamber and said liquid-chamber, an air-valve in said passage, a mechanical connection between said air-valve and said liquid-valve capable of expansion and contraction and manual actuating means operatively connected with said mechanical connection whereby said valves are opened and closed in opposite directions, a passage between said pump cylinder and said air-chamber, a check-valve in said passage, and a manually actuatable valve in said passage between said check-valve and said air-chamber, whereby said air-chamber may be closed from said pump.

9. In a fire-extinguisher, a liquid-chamber, an air-pressure chamber, and a pump cylinder, arranged about each other in the order named, formed by an association of parts comprising a cylindrical shell, a second cylindrical shell arranged within said first named shell, a third cylindrical shell arranged within said second named shell, an upper head having a hole therein in which the upper end of said third named shell is received and a pair of annular grooves therein in which the upper ends of said first and second named shells are received, a lower head having a plurality of annular grooves therein in which the lower ends of said shells are received, a pumping means in said third named shell for building up air-pressure in said air-chamber, a discharge-hose, a liquid-discharge valve having tubular connection with said discharge-hose and the lower end of said liquid-chamber, an air-valve having tubular connection with said air-chamber and said liquid-chamber, a manually operable mechanical connection between said liquid-valve and said air-valve so devised as to cause movement of said valves in opposed directions to combinedly open or close said valves, a filling mouth on said upper head over said liquid-chamber, a removable closure plug in said filling mouth, and a vent-passage in said mouth having tubular connections with said liquid-valve and said discharge-hose, adapted to be closed by said closure plug when inserted in said mouth and adapted to be opened to break a vacuum in said liquid-valve and allow said hose to drain when said closure plug is removed from said mouth.

10. In a fire-extinguisher, a liquid-chamber, adapted to carry a fire-extinguishing liquid, an air-chamber arranged within said liquid-chamber, a pumping means arranged within said air-chamber, a liquid-valve to control the discharge of liquid from said liquid-chamber, an air-valve to permit pressure from said air-chamber to enter said liquid-chamber, means to combinedly operate said valves in opposite axial directions, a filling mouth on said liquid-chamber, a removable closure plug therein, a tubular extension depending from said filling mouth into said liquid-chamber, whereby an air-pocket is formed over the liquid.

11. In a fire-extinguisher, a liquid-chamber, an air-chamber, a pumping means to build up pressure in said air-chamber, an air-valve tubularly connected with said air-chamber and said liquid-chamber, a discharge-hose, a liquid-valve tubularly connected with said discharge-hose and said liquid-chamber, manual operating means to combinedly actuate said valves in opposite directions, a pressure-indicating gage tubularly connected with said air-chamber, and a protecting hood mounted on said chamber over said indicating gage so devised as to permit the indicating face of said indicating gage to be visible.

12. In a fire-extinguisher, a liquid-chamber, an air-chamber, and a pump cylinder arranged within each other in the order named, said chambers formed by an association of parts consisting of an upper head, a lower head, a plurality of cylindrical shells, each of said shells being of a diameter different than the remaining shells, each of said heads having a purality of annular upstanding ribs between which the respective ends of said shells are secured, an air-valve tubularly connected with said air-chamber, and said liquid-chamber, a discharge-hose, a liquid-valve tubularly connected with said discharge-hose and said liquid-chamber, manually operable means mechanically connecting said valves and so arranged as to open and close said valves by movements in opposite directions, and retaining means for said hose comprising an open side socket integrally formed with said upper head, the entrance thereto being smaller than the diameter thereof.

13. In a fire-extinguisher, a liquid-chamber, an air-chamber, a pumping means for charging said air-chamber, an air-valve tubularly connected with said air-chamber and said liquid-chamber, a liquid-valve tubularly connected with the lower end of said liquid-chamber, a manually operable mechanical connection between said valves and whereby said valves are actuated in opposite directions, a discharge-hose comprising flexible metallic tubing, and a rubber sheath surrounding said metallic tubing, a discharge nozzle, a reduced extension thereon having a counterbore therein in which one end of said metallic tubing is received, a nipple having threaded connection with said liquid-valve, a reduced extension on said nipple having a counterbore therein in which the other end of said metallic tubing is received, said extensions of said nipple and said nozzle having annular grooves therein, and clamping ferrules received about the ends of said hose to compel the material of said sheath to be forced into said grooves whereby said nipple and nozzle are firmly secured to said hose.

14. In a fire-extinguisher, an outer cylindrical shell, an intermediate cylindrical shell, and an inner cylindrical shell, arranged concentrically within each other in the order named, an upper head having an annular groove therein adjacent its periphery in which the upper end of said outer shell is received, a second annular groove therein arranged concentrically within said first named groove in which the upper end of said intermediate shell is received, and a hole therein located concentrically with said previously named grooves in which the upper end of said inner shell is received, a lower head having a plurality of concentric grooves in which the lower ends of said shells are received, the association of shells and heads forming a liquid-chamber, an air-chamber and a pump cylinder arranged concentrically within each other in the order named, a pumping means in said pump cylinder, a liquid-valve comprising a valve body integrally formed with said upper head, a disk-valve operable therein, a discharge-hose having tubular connection with said liquid valve body, a stand pipe forming connection between said liquid valve body and the lower end of said liquid-chamber, an air valve body integrally formed with said upper head and having a valve-chamber therein tubularly connected with said air-chamber and said liquid-chamber, a needle-valve operable in said last named valve-chamber, a valve-shaft mounted for reciprocal and rotary movement in said liquid valve-chamber, a valve-disk on said valve-shaft within said liquid valve-chamber, a screw connection between said needle-valve and said valve-shaft, whereby said valves are caused to open when approaching each other and caused to close when receding from each other, manual operating means on said valve-shaft, a filling mouth integrally formed with said head, a closure plug in said mouth, a vent-passage in said mouth to cause drainage of said hose when said plug is removed, a tube extending downwardly from said filling mouth into said liquid-chamber whereby an air-pocket is formed above the liquid, hose-retaining means integrally formed with said head wherein said hose is carried when not in use, a passage in said upper head between said pumping means and said air-chamber, a check-valve in said passage, and a needle-valve in said passage between said check-valve and said air-chamber.

15. In a fire-extinguisher, a liquid-chamber, a pressure-chamber, a common head for said chambers, means comprising a service-valve housed in said head for controlling the discharge of liquid from said liquid-chamber, means comprising a second service-valve housed in said head for controlling the passage of pressure from said pressure-chamber to said liquid-chamber, and common actuating means for said service-valves.

16. In a fire-extinguisher, a liquid-chamber, a pressure-chamber, and an air-pump in parallel relation, a head common to said chambers through which the pump-plunger works, said head being provided with a charging air-duct through which air may pass from pump to pressure-chamber, with a service air-duct from pressure-chamber to liquid-chamber, and with a liquid-outlet duct, a conduit leading from the lower portion of the liquid-chamber to said liquid-outlet duct, service-valves housed in said head and controlling said second-mentioned air-duct and said liquid-outlet duct, respectively, and common actuating means for said service-valves.

17. In a fire-extinguisher, a liquid-chamber, a pressure-chamber, and a centrally located air-pump in parallel relation, a head common to said chambers through which the pump-plunger works, said head being provided with a charging air-duct through which air may pass from pump to pressure-chamber, with a service air-duct from pressure-chamber to liquid-chamber, and with a liquid-outlet duct, a conduit leading from the lower portion of the liquid-chamber to said liquid-outlet duct, service-valves housed in said head and controlling said second-mentioned air-duct and said liquid-outlet duct, respectively, and common actuating means for said service-valves.

18. In a fire-extinguisher, a liquid-chamber, a pressure-chamber, and an air-pump in parallel relation, a combined head and valve-housing surmounting said chambers and having an opening housing the upper end-portion of the pump-casing, said head having therein an air-valve chamber and a liquid-valve chamber and air-ducts leading to the pressure-chamber and from the pressure-chamber to said air-valve chamber and thence to the liquid-chamber, an eduction-pipe extending from the lower portion of said liquid-chamber and communicating with said liquid-valve chamber, a liquid-outlet passage from said liquid-valve chamber, service-valves in said valve-chambers, and common actuating means for said service-valves.

19. In a fire-extinguisher, a liquid-chamber, a pressure-chamber, and a centrally located air-pump in parallel relation, a common upper head for said chambers supporting the upper end of the pump-casing, a pump-plunger working through the upper end of the pump-casing, a charging air-duct in said head through which air may pass to the pressure-chamber, a service air-duct in said head through which pressure may pass from the pressure-chamber to the liquid-chamber, a liquid-outlet duct in said head and an eduction pipe leading thereto from the lower portion of the liquid-chamber, service-valves housed in said head and guarding the air-duct leading to the liquid-chamber and the liquid-outlet duct, common actuating means for said service-valves, and a manually operated shut-off valve mounted in said head and serving to securely close said charging air-duct after the pressure-chamber has been charged.

20. In a fire-extinguisher, a lower head, an upper head provided centrally with an opening, three shells interposed between and secured to said heads and forming a liquid-chamber, a pressure-chamber, and a pump-casing, the upper end of said pump-casing being received in said central opening, a pump-plunger working through the upper end of said pump-casing and having a handle disposed normally above said upper head, a charging air-duct in said upper head communicating with the pump and with the pressure-chamber, a shut-off valve housed in said head and adapted to securely close said duct after the pressure-chamber has been charged, a service air-duct in said upper head for establishing communication between the pressure-chamber and the liquid-chamber, a service liquid-duct through said upper head, a hose mounted on said upper head and communicating with said last-mentioned duct, a liquid-eduction pipe depending from said upper head to the lower portion of said liquid-chamber and communicating at its upper end with said last-mentioned duct, and service valve-mechanism mounted on said upper head and controlling said service-ducts, said valve-mechanism having a single actuating means controlling both said service-ducts.

21. In a fire-extinguisher, a lower head, an upper head having therethrough a central opening and having therein a charging air-duct and communicating valve-chamber, a service air-duct and communicating valve-chamber, and a liquid-outlet duct and communicating valve-chamber, a manual valve in said first-mentioned valve-chamber for securely closing the charging air-duct, valves in the second-mentioned and third-mentioned valve-chambers controlling, respectively, the service air-duct and the liquid-outlet duct, common actuating means for said last-mentioned valves, three shells interposed between and secured to said heads and forming therewith a liquid-chamber, a pressure-chamber, and a pump-casing, the upper end of the latter extending into said central opening and equipped with a stuffing-gland, a pump-plunger working through said stuffing-gland, and having a handle disposed over said upper head, said charging air-duct serving in conducting air from the pump to the pump-casing and said service air-duct serving in conducting air from the pump-casing to the liquid-chamber, and a pipe depending from said upper head and affording a liquid-outlet conduit from the lower portion of the liquid-chamber to the liquid-outlet duct in said upper head.

22. In a fire-extinguisher, a lower head, an upper head having therethrough a pump-opening and having therein a charging air-duct, a service air-duct, and a service liquid-duct, said upper head having also therein service-valve chambers intersecting the service ducts, service-valves housed in said valve-chambers, common actuating means for said service-valves, a hose mounted on said upper head and communicating with the service liquid-duct, a liquid-eduction pipe depending from said upper head and communicating with the service liquid-duct, shells interposed between and secured to said heads and forming therewith a pressure-chamber and a liquid-chamber, a pump-casing depending from the opening in said upper head, and a pump-plunger working through the upper end of said pump-casing and equipped with a handle overlying said upper head, the pump-casing communicating with said charging air-duct, the service air-duct providing communication between said pressure-chamber and liquid-chamber, and the liquid-eduction pipe depending into said liquid-chamber to the lower portion thereof.

23. In a fire-extinguisher, a lower head and an upper head provided with shell-receiving flanges, shells interposed between said heads and forming a pressure-chamber and a liquid-chamber, a pump depending from said upper head and equipped with a plunger working through said upper head, said upper head having a charging air-duct therein communicating with the pump and pressure-chamber, a service air-duct through said upper head from the pressure-chamber to the liquid-chamber, a service liquid-duct through said upper head communicating with a conduit leading from the lower portion of the liquid-chamber, and a service-valve mechanism provided with valve means mounted in said upper head and cooperatively controlling both said service ducts.

24. In a fire-extinguisher, a lower head, an upper head, and interposed shells forming a pressure-chamber and a liquid-chamber, the upper head being equipped with means for charging the liquid-chamber and being provided with a service air-duct and a service liquid-duct, service-valves housed in said upper head and controlling the service ducts, common actuating means for said service-valves, a conduit leading from the lower portion of the liquid-chamber to the service liquid-duct, an air-pump depending from said upper head and having a plunger working therethrough, said upper head having a charging air-duct communicating with said pump and with said pressure-chamber, and a shut-off valve housed in said upper head and controlling said charging air-duct, said shut-off valve having an adjusting stem equipped with actuating means disposed above said upper head.

25. In a fire-extinguisher, a lower head, an upper head, and interposed shells forming a pressure-chamber and a liquid-chamber, the upper head being equipped with means for charging the liquid-chamber and being provided with a service air-duct and a service liquid-duct, service-valves housed in said upper head and controlling the service ducts, common actuating means for said service-valves, a conduit leading from the lower portion of the liquid-chamber to the service liquid-duct, an air-pump depending from said upper head and having a plunger working therethrough, said upper head having a charging air-duct communicating with said pump and with said pressure-chamber, a shut-off valve housed in said upper head and controlling said charging air-duct, said shut-off valve having an adjusting stem equipped with actuating means disposed above said upper head, a pressure-gage mounted on said upper head above the pressure-chamber and communicating therewith, and a protecting housing for said gage mounted on said upper head.

26. In a fire-extinguisher, a liquid-chamber, a pressure-chamber, and an air-pump in parallel relation, a head common to said chambers and provided with a charging air-duct through which air may pass from pump to pressure-chamber, with a service air-duct from pressure-chamber to liquid-chamber, and with a liquid-outlet duct, a conduit leading from the lower portion of the liquid-chamber to said liquid-outlet duct, service-valves housed in said head and controlling said second-mentioned air-duct and said liquid-outlet duct, respectively, and common actuating means for said service-valves.

27. In a fire-extinguisher, a liquid-chamber, a pressure-chamber, a common head for said chambers having therein a service air-duct from pressure-chamber to liquid-chamber and a service liquid-duct serving as an outlet from said liquid-chamber, a valve-shaft mounted in said head and equipped with an operating handle, and service-valves guarding said service ducts, said service-valves being operatively connected with said valve-shaft and shiftably related to each other.

28. In a fire-extinguisher, a liquid-chamber, a pressure-chamber, a common head for said chambers having therein a service air-duct from pressure-chamber to liquid-chamber and a service liquid-duct serving as an outlet from said liquid-chamber, a valve-shaft journalled in said head, co-axial service-valves guarding said service ducts and having connections with said valve-shaft for effecting relative longitudinal shifting of said service-valves, and an operating wheel on said shaft.

ALBERT B. PHISTER.